No. 653,399.  
J. W. RAPP.  
SASH AND SASH FRAME.  
(Application filed Mar. 10, 1899.)  
Patented July 10, 1900.
(No Model.)
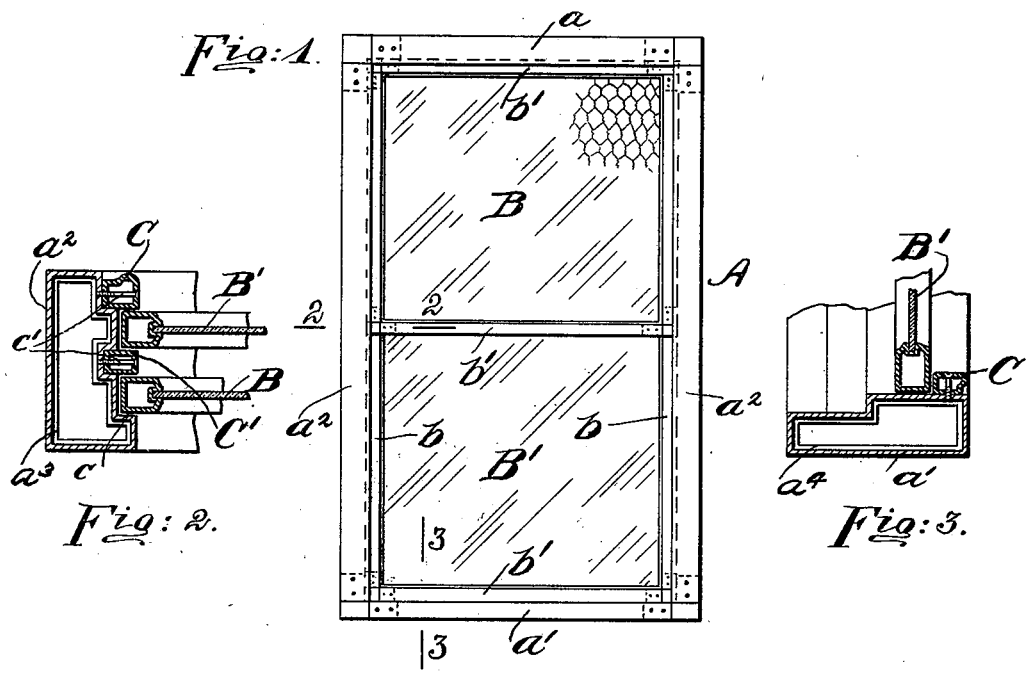
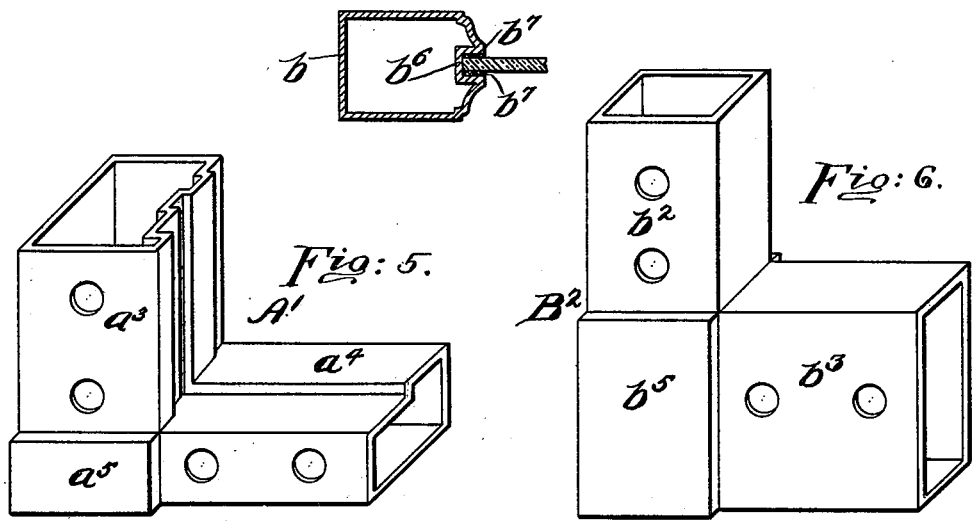
WITNESSES:
INVENTOR  
John W. Rapp.  
By Edwin H. Brown.  
His Atty.

UNITED STATES PATENT OFFICE.

JOHN W. RAPP, OF NEW YORK, N. Y.

SASH AND SASH-FRAME.

SPECIFICATION forming part of Letters Patent No. 653,399, dated July 10, 1900.

Application filed March 10, 1899. Serial No. 708,526. (No model.)

*To all whom it may concern:*

Be it known that I, JOHN W. RAPP, a citizen of the United States of America, residing in the borough of Manhattan, city, county, and State of New York, have invented certain new and useful Improvements in Sash and Sash-Frames, of which the following is a specification.

My invention relates to sashes and sash-frames.

I will describe a sash and a sash-frame embodying my invention and then point out the novel features thereof in the claims.

In the accompanying drawings, Figure 1 is a view in elevation of a sash-frame and sashes therein, each embodying my invention. Fig. 2 is a detail transverse sectional view taken on the line 2 2 of Fig. 1. Fig. 3 is a detail vertical sectional view taken on the line 3 3 of Fig. 1. Fig. 4 is a detail transverse sectional view of a part of the sash. Fig. 5 is a perspective view of an elbow used for connecting the parts of a sash-frame. Fig. 6 is a perspective view of an elbow used for connecting the parts of a sash. Figs. 2, 3, 4, 5, and 6 are drawn to a scale larger than the scale of Fig. 1.

Similar letters of reference designate corresponding parts in all of the figures.

A represents the sash-frame, and B B' sashes fitted and sliding in said frame. The sash-frame and sashes are made of metal to render them fireproof, and the glass fitted in the sashes preferably contains wire.

The head $a$, sill $a'$, and sides $a^2$ of the sash-frame are made from metal, such as metal tubing. The desired form in cross-section for each of said parts may be given it by any suitable means. Preferably a die is used through which the tube is drawn. When the parts are set up and united, a cased sash-frame will be formed. A' represents an elbow which is also of metal, the desired form being obtained by any suitable means—as, for example, by casting—and forming a coupling for the ends of the parts of the sash-frame to be united. The extensions $a^3$ $a^4$ are adapted to enter an end of a side piece and an end of either the bead or sill, and the extensions are held in the ends of such parts by means of bolts or screws, which enter tapped openings formed in the ends of the side and bead or sill pieces and in the said extensions. A shoulder $a^5$ is formed on each side of the elbow, against which the ends of the parts of the frame which the elbow connects abut. As shown, one extension $a^3$ of the elbow is preferably formed with an outer periphery, which corresponds with the inner periphery of the sides $a^2$, while the other arm $a^4$ is preferably formed with an outer periphery, which corresponds with the inner periphery of the bead or sill.

C represents the outer bead, and C' the parting-bead, of the sash-frame. A projection $c$ on each side piece of the sash-frame forms the inner bead. The outer and parting beads are also of metal and are given a desired shape in cross-section by any suitable means—as, for example, by drawing the metal forming them through a die. They are secured in position in the sash-frame by means of bolts $c'$. If desired, the extension $c$ on each side piece may be done away with and a metal bead secured to each side piece in its place. The frames of the sashes B and B' are also of metal, such as metal tubing. The side pieces or stiles $b$ and top and bottom rails $b'$ may be of the same form in cross-section, (such, for example, as seen in Fig. 4,) and this form is preferably produced by drawing the tubing through a die.

B² represents an elbow of metal, the desired form being obtained by any suitable means—as, for example, by casting—and forming a coupling for the ends of the parts of the frame to be united. The extensions $b^2$ $b^3$ of the elbows enter the ends of the parts to be united, and the elbows and such parts are held together by means of bolts or screws. The bolts or screws pass through tapped openings in the frame parts and similar openings in the elbows. A shoulder $b^5$ is formed on each side of the elbow, against which the ends of the parts which the elbow connects abut. A recess $b^6$ is formed in the stiles and top and bottom pieces of the frame to receive the edges of the glass. A packing $b^7$, of rubber or other material, is placed in the recesses on each side of the glass to prevent any movement of the glass in the sash. The sashes may be hung in the sash-frame by any desired means and in any desired manner.

By this construction for a sash-frame and sash the parts thereof can be easily and quickly taken apart and put together. The different parts of the sash-frame and sash can also be made in any desired lengths and then cut from the stock as needed.

What I claim as my invention is—

1. The combination with a sash-frame, of the metallic top and bottom pieces, the metallic side pieces each formed in a single piece, said top, bottom, and side pieces being formed from tubing and each drawn through a die to give it the requisite shape in cross-section, and elbows serving as couplings for the top and side pieces and bottom and side pieces, substantially as described.

2. The combination in a sash-frame, of the metallic top and bottom pieces, the metallic side pieces each formed in a single piece, beads secured to the side pieces for forming sash-slides, elbows serving as couplings for the top and side pieces and bottom and side pieces, and sashes sliding in the slides of said frame, substantially as described.

3. The combination in a sash-frame of the metallic top, bottom, and side pieces, and metallic elbows for connecting together said top, bottom, and side pieces, said elbows being provided with shoulders against which the ends of the parts connected thereby abut.

4. The combination of a sash-frame, and sashes located therein, each of said sashes comprising metallic side pieces and top and bottom rails, and metallic elbows connecting said side pieces and top and bottom rails, said elbows being provided with shoulders against which the ends of the parts connected thereby abut.

In testimony whereof I have signed my name to this specification in the presence of two subscribing witnesses.

JOHN W. RAPP.

Witnesses:
W. LAIRD GOLDSBOROUGH,
GEO. E. CRUSE.